Patented Dec. 24, 1935

2,025,399

UNITED STATES PATENT OFFICE 2,025,399

TOPICAL ANÆSTHETIC

Sverre Quisling, Madison, Wis.

No Drawing. Application August 29, 1933,
Serial No. 687,385

3 Claims. (Cl. 167—52)

This invention relates to local anæsthesia as produced by topical application of a combination of certain chemicals.

Local anæsthetics as heretofore used have either been used by hypodermic injection with accompanying pain using certain fluids which tended to lower tissue resistance; or by painful freezing of tissues spraying on highly volatile fluid which is sometimes followed by death of tissues. Both processes are followed by after pains.

Besides overcoming these disadvantages another purpose of my invention is to use a combination of substances which besides not causing physical injury to the skin shall be antiseptic and shall be more simple to apply.

In order to overcome danger of idiosyncrasy to drug action—so common when a new drug is brought forward—no drug is included in this combination which has not been extensively tested on the skin for at least thirty years. My invention consists of finding a combination of drugs to obtain safe antiseptic topical anæsthesia. It must be understood that the specific method of application and concentration of substances given herein are illustrative of the best results obtained in a long series of experiments—but that changes may be made without departing from the claims or sacrificing any advantages thereof.

After performing a very large series of experiments I discovered a non-irritating solvent for methyl-ortho-droxy-benzene also known as guaiacol in 50 to 100 per cent. concentrated solutions of sodium salicylate or sodium benzoate used together or singly in water or water and alcohol. This solution was found to be a good topical anæsthetic and because of its ingredients also a good antiseptic.

Methyl-ortho-droxy-benzene known as guaiacol has been used some thirty years locally in full concentration or in solution in chloroform to relieve the pain of orchitis, but such applications act too slow, too weakly and are too toxic if a large amount is used to be of value for local anæsthesia. No non-irritating and adjuvant anæsthetic solution for guaiacol preceded my discovery aforementioned.

This anæsthetic action was found to be present even tho the concentration of guaiacol was varied from 5 to 25 per cent but 10 per cent seemed to be the most effective. Variation in the amount of sodium salicylate and sodium benzoate did not seem to affect the activity of the solution as long as enough of either or both were present in the solution to keep the guaiacol in solution—but absence of any sodium salicylate in the solution materially weakened the anæsthetic action. Absence of any ethyl alcohol also weakened the action but small variations did not effect anæsthesia. A solution illustrative of the concentrations found particularly effective follows:

| | Parts |
|---|---|
| Water | 4 |
| Alcohol | 1 |
| Sodium salicylate | 3 |
| Sodium benzoate | 1 |
| Guaiacol | 1 |

The method of application was also found to be very important to produce anæsthesia. The method found most rapid was first to prepare the area to be anæsthetized by application of a hot compress of concentrated salt solution. This tended to dehydrate the skin, bring the blood to the surface and thus increase absorption. This was left on 2–3 minutes—the skin wiped dry and then the solution painted on with a glass applicator. The solution was left to dry and absorb two minutes and then another application was applied and then in two minutes the third application. A compress of cold water was then applied to decrease the concentration of the sodium benzoate and sodium salicylate in the solution absorbed by the tissues which would thus free the guaiacol held in solution. This procedure was found effective in producing rapid anæsthesia. If complete anæsthesia did not result the last procedures were repeated.

This method of anæsthesia was found particularly useful for removal of superfluous hair, for injection of hypodermic needles, and electrocautery of the skin. It was also effective in relieving pain of neuritis and rheumatism. It should also be effective in many minor surgical procedures.

A search of medical literature and patent art reveals no similar mixture or method for local anæsthesia. The drugs included have been used internally and externally for other purposes—doses far in excess of those necessary for ordinary use for the purpose here indicated have been used without any danger. For safety I recommend the limit dose of suggested formula per treatment of 3 teaspoons in four hours.

It is of course understood that the specific technic and substances listed here are in concentration and mixture merely illustrative of several variations in which same were used with good results and that changes may be made without departing from the claims or sacrificing any of the advantages therein.

I claim:—

1. A topical anæsthetic aqueous solution comprising guaiacol in anæsthetic amount and a compound of the group consisting of sodium salicylate and sodium benzoate in amount sufficient to render the guaiacol soluble.

2. A topical anæsthetic aqueous solution comprising guaiacol in anæsthetic amount with sodium salicylate present in amount sufficient to render the guaiacol soluble.

3. A topical anæsthetic aqueous solution comprising guaiacol in anæsthetic amount with sodium benzoate present in amount sufficient to render guaiacol soluble.

SVERRE QUISLING.